(12) United States Patent
Nikic

(10) Patent No.: US 9,637,224 B2
(45) Date of Patent: May 2, 2017

(54) PLASMA-ASSISTED SYNTHETIC JETS FOR ACTIVE AIR FLOW CONTROL

(71) Applicant: The Boeing Company, Chicago, IL (US)

(72) Inventor: Dejan Nikic, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 74 days.

(21) Appl. No.: 14/186,760

(22) Filed: Feb. 21, 2014

(65) Prior Publication Data

US 2015/0239552 A1   Aug. 27, 2015

(51) Int. Cl.
| | | |
|---|---|---|
| *B64C 21/04* | (2006.01) | |
| *B64C 19/00* | (2006.01) | |
| *B64C 23/00* | (2006.01) | |
| *F15D 1/00* | (2006.01) | |
| *H05H 1/24* | (2006.01) | |

(52) U.S. Cl.
CPC ............ *B64C 21/04* (2013.01); *B64C 19/00* (2013.01); *B64C 23/005* (2013.01); *F15D 1/0075* (2013.01); *H05H 1/2406* (2013.01); *B64C 2230/12* (2013.01); *B64C 2230/18* (2013.01); *H05H 2001/2412* (2013.01); *Y02T 50/166* (2013.01)

(58) Field of Classification Search
CPC ....... B64C 21/04; B64C 19/00; B64C 23/005; B64C 2230/12; B64C 2230/18; F15D 1/0075
See application file for complete search history.

(56) References Cited

U.S. PATENT DOCUMENTS

| | | | | |
|---|---|---|---|---|
| 3,853,730 A | * | 12/1974 | Anderson | ............... B63B 59/00 204/196.06 |
| 6,075,321 A | | 6/2000 | Hruby | |
| 6,412,732 B1 | * | 7/2002 | Amitay | ................ B64C 23/005 244/200 |
| 2006/0131282 A1 | * | 6/2006 | Miller | ................... B64C 23/005 219/121.5 |
| 2007/0089795 A1 | | 4/2007 | Jacob | |
| 2010/0051242 A1 | * | 3/2010 | Arik | ......................... F15D 1/00 165/104.33 |

(Continued)

FOREIGN PATENT DOCUMENTS

| | | |
|---|---|---|
| FR | 2955628 A1 | 7/2011 |
| WO | 2011/004124 A2 | 1/2011 |

OTHER PUBLICATIONS

Xia et al., "Experimental Investigation of Microhollow Cathode Discharge for the Application to Microplasma Thrusters", Tsinghua Science and Technology, Dec. 2009, vol. 14—No. S2, Tsinghua University, China.

(Continued)

*Primary Examiner* — Timothy D Collins
*Assistant Examiner* — Jessica Wong
(74) *Attorney, Agent, or Firm* — Patterson + Sheridan, LLP

(57) ABSTRACT

A plasma-assisted synthetic jet device, an aircraft including a plasma-assisted synthetic jet device, and a method of improving aerodynamic properties are disclosed for providing air flow control at an aerodynamic structure by ionizing one or more gases exiting through an aperture of the synthetic jet device disposed in the aerodynamic structure.

22 Claims, 7 Drawing Sheets

(56) References Cited

U.S. PATENT DOCUMENTS

| | | | |
|---|---|---|---|
| 2010/0133386 A1* | 6/2010 | Schwimley | B64C 23/005 244/205 |
| 2010/0229952 A1 | 9/2010 | Smith et al. | |
| 2011/0089835 A1 | 4/2011 | Miller et al. | |
| 2011/0253842 A1* | 10/2011 | Silkey | B64C 23/005 244/205 |

OTHER PUBLICATIONS

Shin et al., "Exhaust Plume Characteristics of Microhollow Cathode Discharge Plasma Thruster", IEEE Transactions on Plasma Science, Nov. 9, 2011, vol. 39, No. 11. Online.
Schoenbach et al., "Microhollow Cathode Discharges", Appl. Phys. Lett. 68 (1), Jan. 1, 1996, American Institute of Physics.
European Search Report for EP14195327, Jul. 13, 2015.

* cited by examiner

PLASMA-ASSISTED SYNTHETIC JETS FOR ACTIVE AIR FLOW CONTROL

FIELD

The present disclosure relates to aerodynamic structures, and more specifically, to improved aerodynamic properties of aerodynamic structures using air flow control.

BACKGROUND

The performance of aerodynamic structures depends primarily on the lift and drag forces created at the surface of the structures in response to passing air flow. Mechanically fixed surfaces may be selectively included at aerodynamic surfaces, such as rotor blades, wings, engine inlets, fan blades, nozzles, etc., in order to alter local aerodynamic properties and thus achieve desired aerodynamic properties for those aerodynamic structures. Additionally, movable control surfaces, such as flaps, slats, spoilers, ailerons, elevators, and rudders, may be included in or on the aerodynamic surfaces in order to dynamically alter the geometry of the aerodynamic surface, thus altering the aerodynamic properties of the structure.

Beyond the various mechanical means included on aerodynamic structures, aerodynamic properties of the structures may also be altered by causing effects on the passing air flow. These effects may be generated by various actuating devices disposed in or on the aerodynamic surface or device.

SUMMARY

One embodiment provides a synthetic jet actuator that includes an aerodynamic structure having an aerodynamic surface and forming an aperture through the aerodynamic surface. The synthetic jet actuator also includes one or more walls forming a chamber within the aerodynamic structure and adjacent to the aerodynamic surface, wherein the chamber is in fluid communication with an ambient environment through the aperture. The synthetic jet actuator also includes an ionizing device disposed at the aperture and configured to ionize chamber gases exiting through the aperture.

Another embodiment provides an aircraft that includes a thrust source and one or more lifting surfaces configured to generate a lift force when coupled to the thrust source. The aircraft also includes at least one synthetic jet actuator configured to provide air flow control at an aerodynamic surface of the aircraft, the aerodynamic structure having an aerodynamic surface and forming an aperture through the aerodynamic surface. The synthetic jet actuator includes one or more walls forming a chamber within the aerodynamic structure and adjacent to the aerodynamic surface, wherein the chamber is in fluid communication with an ambient environment through the aperture. The synthetic jet actuator also includes an ionizing device disposed at the aperture and configured to ionize chamber gases exiting through the aperture.

Another embodiment provides a method for flying an aircraft that includes using a thrust source to generate a lift force at one or more lifting surfaces of the aircraft, and providing air flow control at an aerodynamic structure of the aircraft by ionizing one or more gases exiting from a synthetic jet actuator disposed in the aerodynamic structure.

The features, functions, and advantages that have been discussed may be achieved independently in various embodiments or may be combined in yet other embodiments, further details of which can be seen with reference to the following description and drawings.

BRIEF DESCRIPTION OF ILLUSTRATIONS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
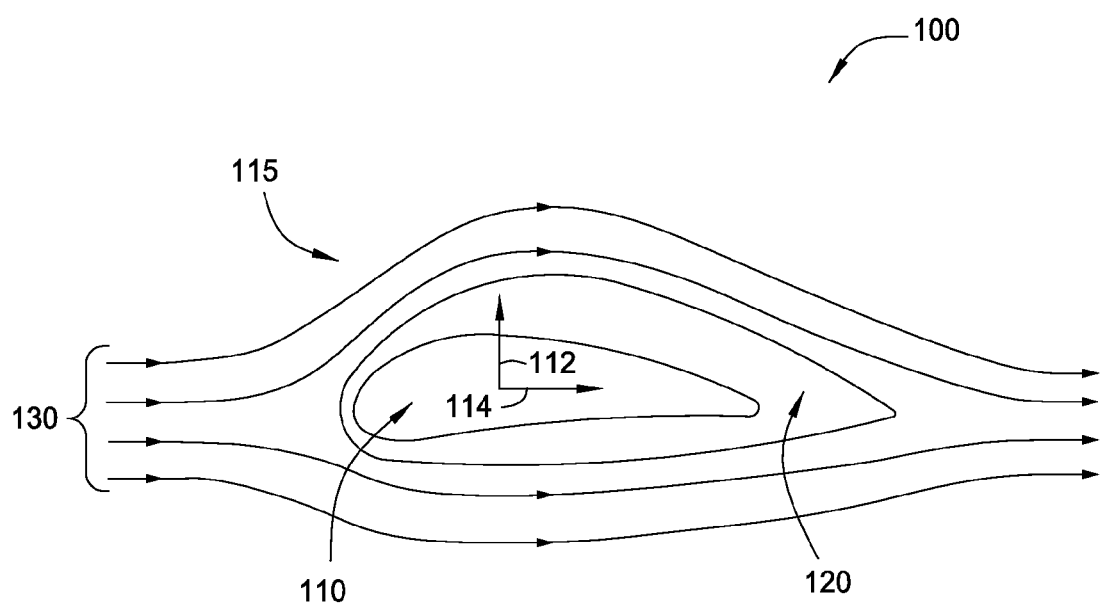
FIG. 1 illustrates a cross-section view of an aerodynamic structure in an air flow, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

To provide enhanced control of air flow at aerodynamic structures, various actuating devices (described in greater detail below) may be included in or on the aerodynamic structures. By controlling the propulsion of gases from the chambers of the actuating devices (i.e., by controlling volumetric flow rate, direction, etc.), and further by selectively ionizing propelled gases, better air flow control near the actuating devices may be achieved. By ionizing the propelled gases, a larger plasma may be formed near the aerodynamic surfaces, which in turn causes a greater attraction force on the passing air flow. As a result, aerodynamic structures that include these actuating devices may exhibit greater aerodynamic performance, such as decreased drag force, increased flow attachment, reduced noise, and reduced turbulent wake. Consequently, the aerodynamic structures may be less prone to stalls and may have decreased stall speeds, and may be able to operate at greater angles of attack without inducing stalls. The propelled, ionized gases may provide superior performance at supersonic or hypersonic speeds.

FIG. 1 illustrates a cross-section view of an aerodynamic structure in an air flow, according to embodiments described herein. For example, aerodynamic structure 100 could represent a device in operation, such as an aircraft wing, a horizontal or vertical stabilizer of an aircraft, or other surface during flight, or could represent a device fixed in a wind tunnel and coupled to appropriate instrumentation or in an experimental configuration. Of course, the aerodynamic structure 100 need not be limited to aerospace applications, but could represent devices used in numerous other contexts, such as high-performance automotive or other commercial or personal transportation, wind power generation, etc. As depicted, aerodynamic structure 100 is disposed within an ambient environment 115. Ambient environment 115 includes a fluid generally surrounding the aerodynamic structure 100 such as atmospheric air; of course, the environment may include other gases or liquids. Aerodynamic structure 100 is shown as an airfoil 110, though similar principles may certainly be applied to devices having different sizes, shapes, or configurations. As shown, air flow 130 passes over and under airfoil 110 from left to right. Air flow 130 is generally laminar (i.e., smooth), but air flow 130 could also include portions of turbulent flow. As the air flow passes over and under the airfoil, the interaction produces aerodynamic forces in various directions, such as lift force 112 and drag force 114 components.

The air flow interaction further creates a boundary layer 120 of air, in which the air velocity is gradually reduced from a free stream velocity (i.e., the velocity at points where the aerodynamic structure does not affect the air flow) to approximately a zero velocity at the surface of the aerodynamic structure 110. The size and shape of boundary layer 120 is related to the aerodynamic properties of the structure, as well as the velocity of the air flow; thus, by altering the size and/or shape of the boundary layer, the amount of drag force created by the structure may also be changed.

Figure 2A:
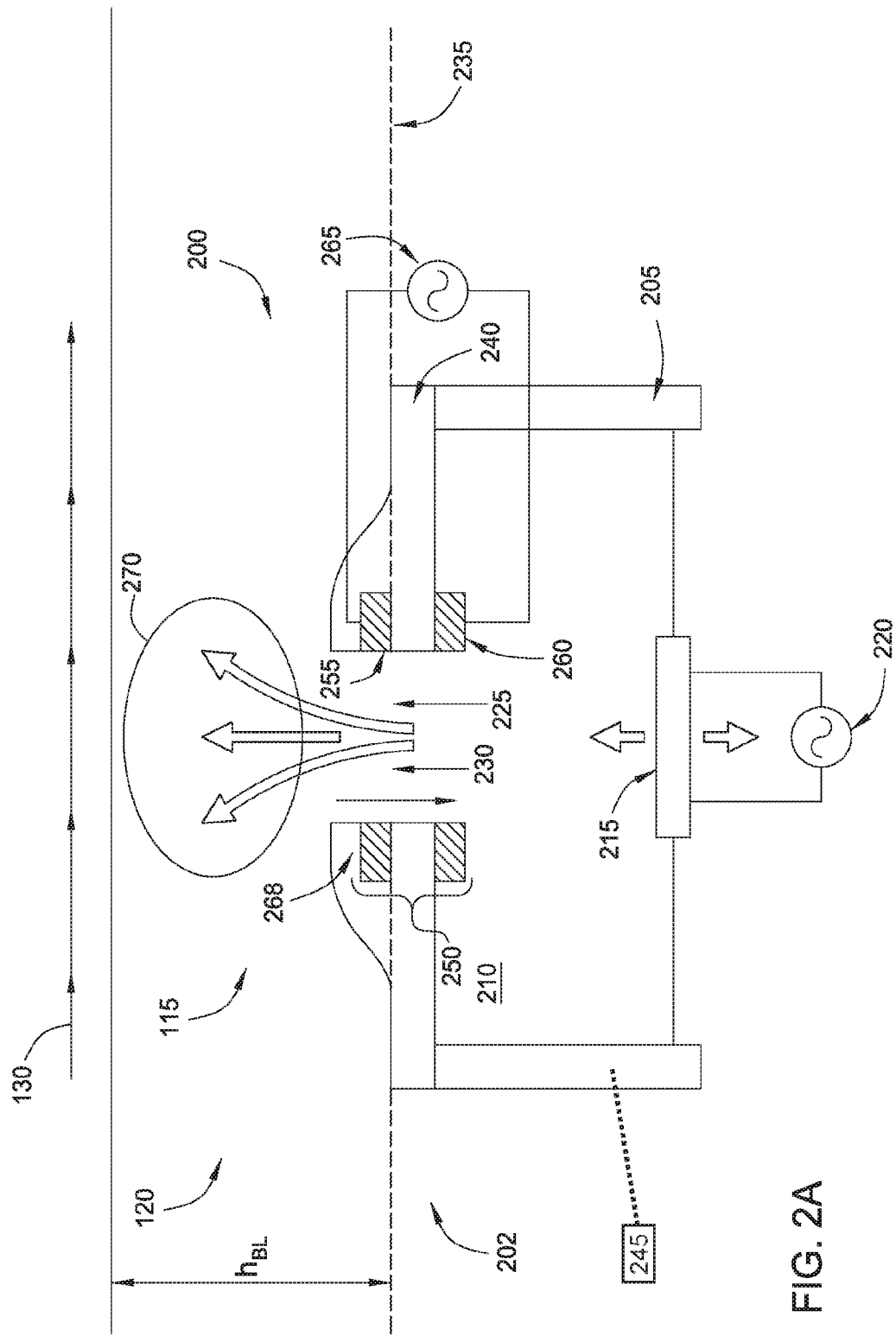
FIGS. 2A-2C illustrate synthetic jet devices, according to embodiments described herein.
Figure 2B:
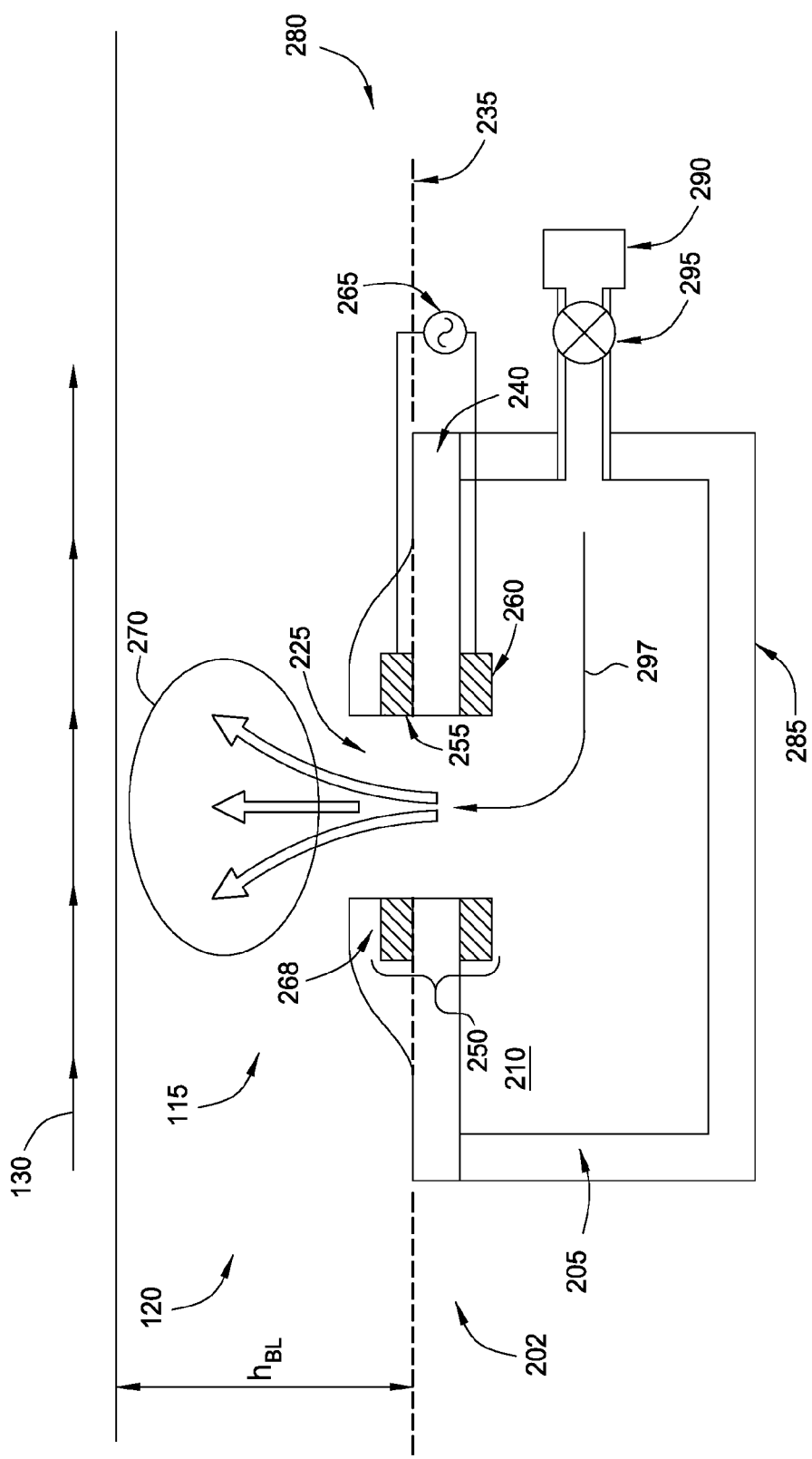
Figure 2C:
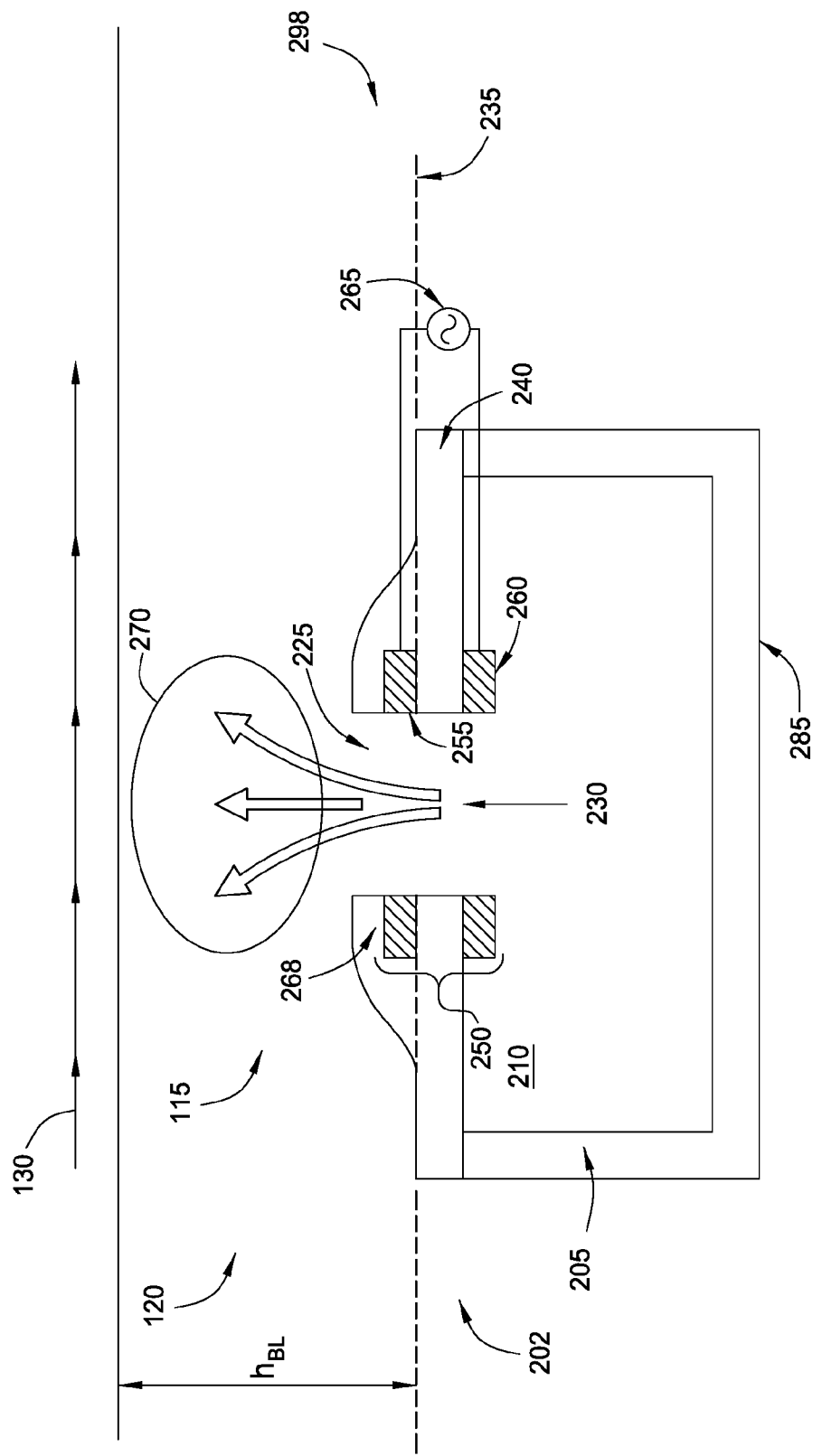

FIGS. 2A-2C illustrate synthetic jet devices, according to embodiments described herein. Synthetic jet devices 200, 280, 298 may generally be included in an aerodynamic structure 202 and operated to affect a boundary layer 120, thus providing reduced drag and other improvements in aerodynamic performance. The effect of the synthetic jet devices on boundary layer 120 may generally be reflected by a reduction of the boundary layer height $h_{BL}$, either locally (i.e., proximate to the synthetic jet device), or along at least a portion of the aerodynamic structure. The synthetic jet devices are further configured to ionize gases propelled out from a chamber, and may thereby exhibit a greater effect on (and offer better control of) passing air flow 130. Several elements in FIGS. 2A-2C share common reference numbers; unless indicated otherwise, the elements may operate or behave in the same or in a substantially similarly manner.

Synthetic jet device 200 includes one or more walls 205 forming a chamber 210. The shape and position of the one or more walls may be selected in order to form chamber 210 with a desired shape and/or volume; for example, the walls may have a rounded shape (from a top view) to form a cylindrical chamber, or the walls may be formed at right angles to form a rectangular chamber. Of course, walls 205 may have a non-uniform profile, such as tapered from top to bottom (or vice versa). The volume of chamber 210 may be selected so as to optimize performance characteristics of the synthetic jet device; the shape of chamber 210 may also be selected to optimize performance, and may further account for practical considerations (i.e., limitations associated with placement of the synthetic jet device within aerodynamic structure 202).

Synthetic jet device 200 includes a piezoelectric-actuated diaphragm 215, which is physically coupled to the one or more walls 205 and forms a boundary of chamber 210. A power supply 220 is coupled to the piezoelectric-actuated diaphragm 215 and configured to cause the diaphragm to oscillate in an upward and downward motion (as shown by the adjacent arrows). Of course, the direction and/or frequency of oscillation may vary depending on the orientation of the diaphragm and/or the synthetic jet device 200. The oscillation of the diaphragm causes pressure changes within chamber 210, which in turn causes air outside the synthetic jet device 200 to be alternately drawn into and propelled out of chamber 210 through aperture 225 (the air movement is represented by arrows 230).

By controlling the frequency and magnitude of the oscillations of the diaphragm (and based on the current conditions of air flow 130), the aerodynamic performance of a particular surface or device may be improved. To provide this control, the power supply 220 may generally be an alternating current (AC) power supply, and may be configured to generate any feasible signal to provide to the diaphragm, such as a sine wave, square wave, ramp, sawtooth, etc. The power supply 220 may be further configured to use pulse-width modulation (PWM) in order to provide a signal having a desired duty cycle to the diaphragm. Power supply 220 may be disposed within aerodynamic structure 202.

In alternative embodiments, diaphragm 215 may be actuated using different means; for example, using electrostatic, electromagnetic, hydraulic, or pneumatic means. In another embodiment, a piston assembly may be used instead of the diaphragm. The piston assembly may form a seal with walls 205 and provide the desired pressure changes within chamber 210 to operate the synthetic jet device.

Synthetic jet device 200 is positioned adjacent to an aerodynamic surface 235, and may include one or more top walls 240 coupled to the walls 205; the one or more top walls 240 may form part of aerodynamic surface 235 and may be formed of the same material as the rest of aerodynamic surface 235, or may alternately be formed of a different material. If top wall(s) 240 are not included, walls 205 may be coupled directly to the aerodynamic surface 235, so that aerodynamic surface 235 forms a boundary of chamber 210.

In an alternative embodiment, the synthetic jet device 200 may be set in from an aerodynamic surface 235, thereby providing a selected depth or thickness of the material of the aerodynamic surface between the synthetic jet device 200 and the ambient environment 115.

In order to affect the air flow 130 moving in ambient environment 115, synthetic jet device 200 is in fluid communication with ambient environment 115 through an aperture 225 that is formed through aerodynamic surface 235. Additionally or alternately, the aperture may be formed through the one or more top walls 240 of the synthetic jet device 200. Aperture 225 may have any desired shape and size, and may be selected so as to optimize performance characteristics of the synthetic jet device. In one embodiment, the aperture is circular (as seen from a top view), and may have a fixed diameter between about ten (10) microns and about one hundred (100) microns. In other embodiments, the size of the aperture may be mechanically adjustable in order to control the velocity of fluid flowing therethrough. For example, the aperture could include a motorized valve coupled to a power supply, an adjustable shutter, and/or a movable lid assembly disposed adjacent to the aperture.

Synthetic jet device 200 further includes an ionizing device 250 disposed at the aperture 225. The ionizing device 250 may comprise any type of device capable of ionizing air or other gases, which includes devices configured to produce electric or magnetic fields suitable for ionization. As shown, the ionizing device 250 includes a surface electrode 255 and an inner electrode 260, and each electrode 255, 260 is coupled to a power supply 265. The electrodes may have any feasible shape and size, and may be constructed of any feasible conductive material. In one embodiment, the electrodes may be constructed of a copper foil. In other embodiments, electrode materials may be selected for conductive, structural, and/or other properties; example materials may include graphite, carbon, titanium, brass, silver, platinum, and so forth. To enable electrodes 255, 260 to generate the desired electric or magnetic fields and to avoid electrical shorts, aerodynamic surface 235 and/or top wall(s) 240 may be constructed of a dielectric material (or at least significantly less conductive than the material selected for electrodes 255, 260). Consistent with generally desirable aerodynamic properties, some embodiments may provide an aerodynamic surface 235 and/or top wall(s) 240 that are constructed of carbon fiber, carbon fiber-reinforced polymer, or other composite materials having a suitable strength-to-weight ratio. Of course, aerodynamic surface 235 and top wall(s) 240 may be constructed of different materials.

In several embodiments, each electrode may be attached adjacent to the aerodynamic surface or to the top wall(s), and may have an opening that corresponds to the size and position of aperture 225. In one embodiment, each electrode may be ring-shaped, having a circular opening. The surface electrode 255 may be protected from the conditions of ambient environment 115 by including an insulating layer 268 configured to at least partially cover the surface electrode. The material of insulating layer 268 may be selected based on its thickness or other aerodynamic properties; as insulating layer 268 extends into the ambient environment 115 away from aerodynamic surface 235, too great a thickness may cause an undesirable change in the aerodynamic properties of the aerodynamic surface 235 (e.g., a large thickness tends to create additional drag force). Examples of insulating layer 268 may include an insulating tape or layer(s) of a film coating or of paint. The insulating layer material may primarily be selected based on its dielectric properties (i.e., its ability to withstand operating voltages at a desired thickness or size), and may also be selected for its thermal, chemical, or mechanical resistance properties. In one embodiment, the insulating layer may be a Kapton® (a registered trademark of E.I. du Pont de Nemours and Company) tape or film; other insulating layer materials may include polyimides, polyamides, polyamide-imides, polyetheretherketones, or other polymers having suitable properties.

In alternate embodiments, the surface electrode may be embedded fully or partially beneath the aerodynamic surface, thereby reducing (or eliminating) the effects caused by its profile on the aerodynamic surface. For example, top wall(s) 240 may include a recess of a suitable size and shape to receive the surface electrode adjacent to aerodynamic surface 235. To protect the surface electrode from environmental conditions, the surface electrode could be completely enclosed within the material of top wall(s) 240 or of aerodynamic surface 235, or the size (e.g., depth) of the recess could be selected to further include an insulating layer 268 beneath the aerodynamic surface, thus protecting the surface electrode while minimizing any profile on the aerodynamic surface.

As shown, insulating layer 268 extends only to the lateral edges of aperture 225. In other embodiments, however, the size of the opening in electrodes 255, 260 may vary from the size of the aperture 225; for example, surface electrode 255 may have an opening that is larger than the aperture 225. In such an embodiment, the insulating layer 268 may be formed over the entire surface electrode 255, thus fully shielding the surface electrode 255 from the ambient environment 115 without altering the size of aperture 225. The electrode opening may have any feasible size, constrained by an ability to generate the electric or magnetic fields necessary to ionize propelled gases. Because electrodes 255, 260 are generally aligned with each other (i.e., having little or no lateral offset), a greater ionization efficiency may be realized during operation as a larger fraction of electric field lines may be used for ionization.

Electrodes 255, 260 are coupled to power supply 265, which has parameters (e.g., frequency and magnitude) selected that are capable of ionizing gases as they are propelled out from the synthetic jet device 200 into the ambient environment 115. The ionized, propelled gases may form a plasma 270 adjacent to or near the synthetic jet device 200, which will generally attract air flow 130 toward the aerodynamic surface 235. Power supply 265 is generally an alternating current (AC) power supply and similar to power supply 220 described above, and may be configured to generate any feasible signal (for example, sine wave, square wave, PWM, etc.) to provide to the electrodes 255, 260 for ionizing the propelled gases.

In some embodiments, the signals provided to both the piezoelectric-actuated diaphragm 215 and to electrodes 255, 260 may be a common signal. One embodiment may provide a common signal to both by using a single power supply (as power supply 220 and as power supply 265). Another embodiment may provide power supplies 220 and 265 as separate entities, but synchronize their respective outputs so that essentially the same signal is provided.

In other embodiments, the signals provided to the piezoelectric-actuated diaphragm 215 and to electrodes 255, 260 may differ, but may be selected to provide improved performance of the synthetic jet device 200. For example, the signal provided to piezoelectric-actuated diaphragm 215 may be selected to propel chamber gases at a particular volumetric flow rate and/or cyclic frequency through the aperture 225. The signal provided to electrodes 255, 260 may be optimally synchronized to the signal provided to piezoelectric-actuated diaphragm 215; for example, the signal provided to the electrodes may be delayed (i.e., phase shifted) by a predetermined amount, such that pulses provided at the electrodes 255, 260 are coordinated to ionize a greater amount of air as it is propelled through the aperture 225. In other words, a volume of air is propelled by a piezoelectric-actuated diaphragm 215 in response to the signal pulse provided by power supply 220. Instead of pulsing power supply 265 at the same time as power supply 220, the pulses of power supply 265 may be selectively delayed to reflect an amount of time required for the propelled volume to physically reach the aperture 225. And by applying the ionizing pulses to electrodes 255, 260 as relatively larger amounts of air reaches the aperture 225, a greater ionization efficiency may be achieved (i.e., more ionization occurs for the amount of power delivered to the synthetic jet device 200).

Further, in some embodiments, the power supply 265 may be configured to provide ionizing pulses to electrodes 255, 260 only during a selected portion of the signal cycle that is provided to the piezoelectric-actuated diaphragm 215. For example, power supply 265 may alter its signal output so as to not ionize gases during periods in which piezoelectric-actuated diaphragm 215 oscillates in one direction and draws air into the chamber 210 from the ambient environment 115. During this period, power supply 265 may provide no output signal (i.e., zero volts) to the electrodes 255, 260, or may instead provide a modified output signal, perhaps having a lesser amplitude and/or frequency that is calculated not to ionize any of the gases being drawn into the chamber 210. This may prevent unnecessary damage or wear to the synthetic jet device caused by forming a plasma inside the chamber itself, and may further improve ionization efficiency of the synthetic jet device.

As described above, embodiments may provide power supplies 220 and 265 as separate power supplies, or as a single power supply. The power supply or supplies may be coupled to a synchronization module configured to selectively shift or otherwise tune the signals that are provided to piezoelectric-actuated diaphragm 215 and to electrodes 255, 260. The functions provided by the synchronization module may be achieved through any feasible means, such as by using hardware components (an application-specific integrated circuit, or analog circuitry) and/or software.

Referring now to one embodiment depicted in FIG. 2B, a synthetic jet device 280 is provided which includes several common components with other embodiments described above. Synthetic jet device 280 also includes a bottom wall 285 which may be coupled to the walls 205 in enclosing chamber 210; in one embodiment, bottom wall 285, walls 205, and top wall(s) 240 may be formed as a single unit. A gas source 290 may be in fluid communication with chamber 210 to provide one or more gases to be propelled and/or ionized. A flow controller 295 may be disposed between the gas source 290 and the chamber 210 to control gas flow delivered to the chamber. The gas source may include one or more gases selected for their ionization capability, such as argon, helium, etc.

As the gases provided to chamber 210 approach the ionizing device 250, for example along a path shown by arrow 297, the ionizing device 250 may ionize the gases in a manner similar to that described above. The gases may be propelled through chamber 210 toward aperture 225, and ultimately through the aperture, as atoms of the gases are attracted using the electric or magnetic fields generated by power supply 265 and electrodes 255, 260. In another embodiment, as depicted in FIG. 2C, a synthetic jet device 298 may use ionizing device 250 to propel atoms of atmospheric air without a separate gas source.

Of course, in all the embodiments, a pressure differential may exist between the chamber 210 and ambient environment 115. For example, the velocity of air flow 130 may cause a decreased air pressure in the ambient environment relative to the pressure within the chamber. This pressure differential may be beneficially used to supplement the propulsion provided by the various gas propulsion devices described herein, or in other embodiments the pressure differential may be used as the sole source of propulsion.

Embodiments may achieve additional air flow control by permitting synthetic jet devices 200, 280, 298 to be steerable. For example, top wall(s) 240 may be comprised of a flexible material, such as rubber, and walls 205 or bottom wall 285 may be physically connected to one or more actuating devices 245 configured to pivot the synthetic jet device while the physical couplings between the aerodynamic surface 235, walls 205, and the top wall are maintained. Additionally or alternatively, the walls (i.e., the top walls, walls, and/or bottom wall) of the synthetic jet devices may be suitably shaped and/or disposed within the aerodynamic structure to permit steering movement by the actuating devices 245. The actuating devices 245 may include one or more electromechanical or pneumatic devices physically coupled to the synthetic jet device at discrete points or areas, or coupled to a pivoting surface adjacent to the synthetic jet device (for example, a generally flat surface coupled beneath bottom wall 285). Of course, different synthetic jet devices may be steered together or independently.

Additionally or alternatively, a steering function may be performed using one or more electromagnets 204 (shown in FIG. 2A) adjacent to or in proximity to the synthetic jet devices 200, 280, 298, and for example disposed within the aerodynamic structure 202 and coupled to a power supply 206. When appropriate power signals are applied to the electromagnets 204, the magnetic fields generated may influence (i.e., may either attract or repel) the ionized particles exiting the aperture 225 of the synthetic jet device 200, 280, 298, and thereby selectively steer the direction of the output.

No matter the configuration selected to achieve the steering functions, the opening of top wall(s) 240 of the steerable synthetic jet device may remain at least partially aligned with at the aperture in order to allow propelled gases to be ionized and to exit the chamber.

By controlling the propulsion of gases out from the chamber 210 (by controlling volumetric flow rate, direction, etc.), the synthetic jet devices 200, 280, 298 may provide better air flow control past the aerodynamic surface 235, thus providing improved aerodynamic properties.

Generally, the size of a formed plasma 190 will be proportional to its ability to attract air flow 130; that is, by forming a larger plasma, a greater effect on controlling the air flow may be realized. Providing propelled gases may tend to support formation of a larger plasma, which may further attract the air flow 130. As a result, synthetic jet devices 200, 280, 298 can achieve greater penetration into the boundary layer (in other words, reduce the boundary layer in which drag forces occur), which results in decreased drag. Additionally, the attraction of air flow 130 to the aerodynamic surface 235 may provide better flow attachment to the aerodynamic surface; this generally makes the aerodynamic structure less prone to stalls and may decrease the stall speed for the structure. Similarly, the improved flow attachment to the aerodynamic structure may allow for greater angles of attack without stalling, which may be beneficial for military aircraft or for other high-performance applications. The synthetic jet devices 200, 280, 298 may be particularly well-suited for use across the range of subsonic, supersonic, and hypersonic speeds, whereas devices not using propelled, ionized gases may generally be suitable for use only at subsonic speeds.

Figure 3:
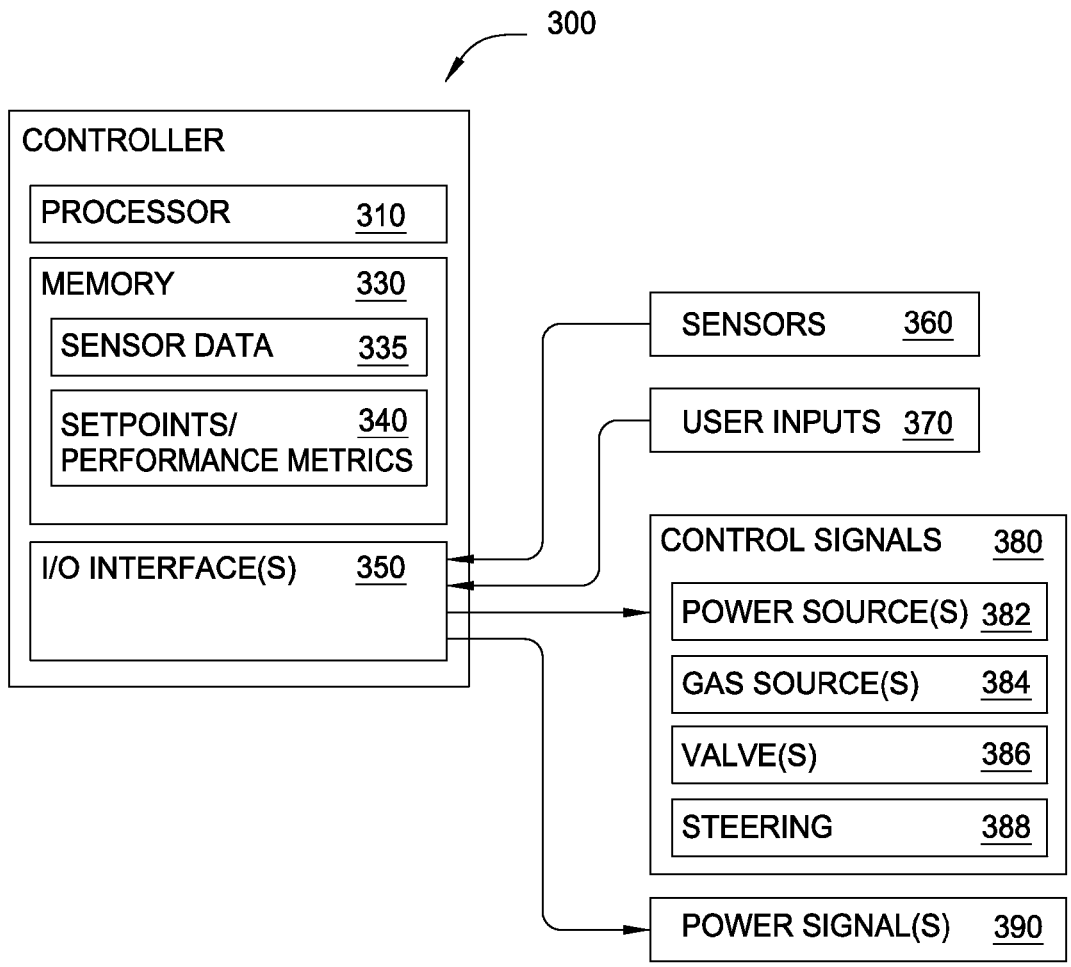
FIG. 3 illustrates a controller for synthetic jet devices, according to embodiments described herein.

FIG. 3 illustrates a controller for synthetic jet devices, according to embodiments described herein. Controller 300 may be employed as a part of an aircraft's overall flight control arrangement. Controller 300 may be employed using separate computing hardware from a main controller, or the functionality described herein may be incorporated as part of a main controller. Controller 300 may be used, for example, with the synthetic jet devices 200, 280, 298 described above. Controller 300 generally includes one or more computer processors 310, a memory 330, and an input/output (I/O) interface 350.

Controller 300 may be coupled through I/O interface 350 to one or more sensors 360, which may generally provide data to the controller, and may be used to complete a control feedback loop. Sensors 360 may be configured to measure one or more parameters of the ambient environment, the aerodynamic structure, or the synthetic jet device, such as various temperatures, flow rate, air speed, humidity, pressure, electric or magnetic fields, voltage, current, and so forth. Controller 300 may also be configured to receive user inputs 370 through the I/O interface 350, for example, using an application programming interface (API). Data received from sensors 360 may be stored in memory 330 as sensor data 335, and the user inputs 370 may be stored as setpoints or performance metrics 340 generally reflecting a desired operation of the aerodynamic structure.

Based on sensor data 335 and the setpoints/performance metrics 340, controller 300 may be configured to calculate or to otherwise determine an optimal employment of the synthetic jet devices. Such an optimization function may include determining which of the synthetic jet devices to operate, at what levels to operate (i.e., power signal magnitude, frequency, and/or gas delivered to the synthetic jet devices), direction(s) to steer the output of synthetic jet devices, and so forth. The optimization function may occur substantially continuously, or may be performed at intervals by the processor 310.

Controller 300 is further configured to provide control signals 380 to several components of the synthetic jet devices. The control signals 380 may be responsive to the determined optimal employment of the synthetic jet devices, or may reflect user-entered setpoints or performance metrics 340. For example, power source signals 382 may be used to optimally control the output provided by power sources 220, 265. In some embodiments, control signals may be sent to gas sources (gas source signal 384) or to the flow controller 295; these signals could indicate, among other things, the selection, quantities, and distribution of gases to be provided to the chamber 210 for propulsion and ionization. Controller 300 may also be configured to provide steering control signals 388 to one or more actuators (or electromagnets) configured to alter the direction of propelled gases from the synthetic jet devices, generally as disclosed above.

Figure 4A:
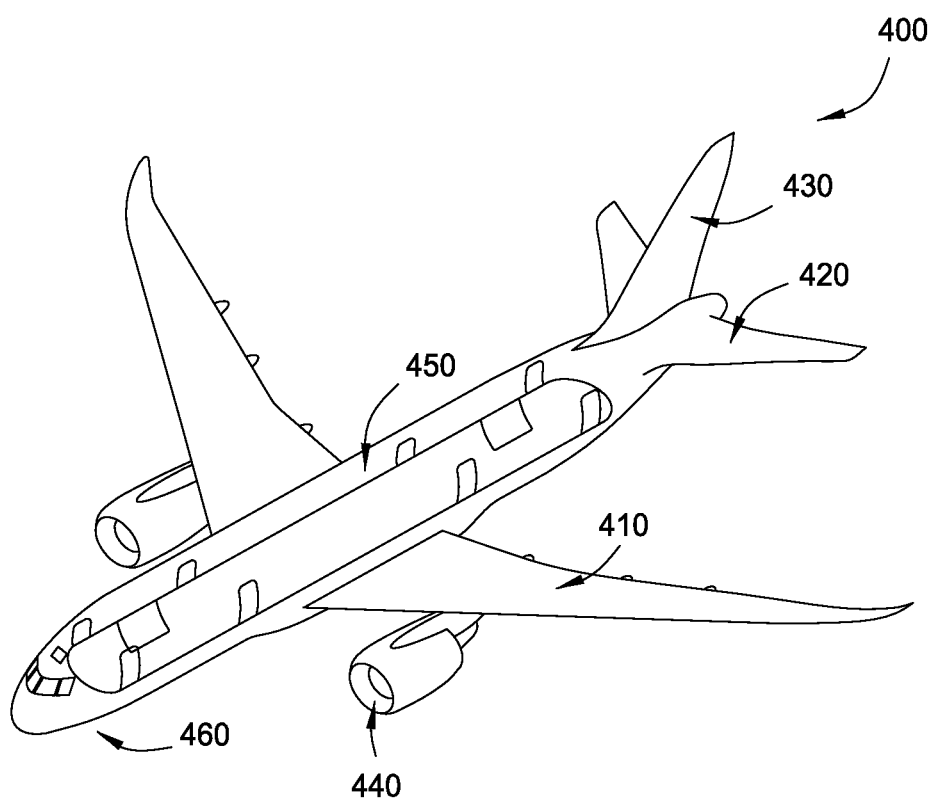
FIG. 4A illustrates an aircraft configured to include synthetic jet devices, according to embodiments described herein.

FIG. 4A illustrates an aircraft configured to include synthetic jet devices, according to embodiments described herein. Generally, synthetic jet devices 200, 280, 298 may be included in aircraft 400 anywhere that smoother or better controlled air flow is desired. For example, synthetic jet devices 200, 280, 298 may be provided along the leading edge and/or trailing edge (or essentially at any other desired position) of the aircraft's lifting surfaces such as wings 410, and may be used to augment or to entirely replace traditional control surfaces such as flaps, slats, ailerons, spoilers, winglets, etc. Embodiments may include synthetic jet devices disposed at approximately corresponding positions on opposite sides of each wing 410.

Synthetic jet devices 200, 280, 298 may be provided along the leading edge and/or trailing edge (or essentially at any other desired position) of horizontal stabilizer 420 or vertical stabilizer 430, and may be used to augment or to entirely replace traditional control surfaces such as rudders, elevators, etc. Embodiments may include synthetic jet devices disposed at approximately corresponding positions on opposite sides of the horizontal stabilizer 420, or on vertical stabilizer 430.

Synthetic jet devices 200, 280, 298 may also be included at an air inlet of jet engines 440, which are the thrust source for aircraft 400. Smoothing the air flow provided to the jet engines may result in more stable and/or more efficient operation of the jet engines, and as described above may permit extended operation of the jet engines (for example, beyond rated limits at least temporarily).

Synthetic jet devices 200, 280, 298 may also be included anywhere along the fuselage 450. The synthetic jet devices may be advantageously placed adjacent to or near auxiliary components of the aircraft that protrude, such as radio antennas, and that generally decrease the aerodynamic properties of the aircraft (i.e., create additional drag). For example, one or more synthetic jet devices could be disposed fore or aft (with respect to the air flow direction) of landing gear 460 to provide smoother air flow past the landing gear when deployed, and thus better overall aerodynamic properties for the aircraft. The synthetic jets could also be selectively turned off or not used when the landing gear is retracted, that is, when compensating for the effects of the landing gear is unnecessary.

While aircraft 400 is depicted as a commercial airplane, the principles and methods may be similarly applied to personal aircraft, sport aircraft, military aircraft, etc. The synthetic jet devices described herein may be included on fixed or moving surfaces (for example, the rotor blades of a helicopter) while producing similar advantages. Still further, the principles and methods described herein may also be applied in other aerodynamic fields, such as high-performance automotive or other commercial or personal transportation, wind power generation, etc.

Figure 4B:
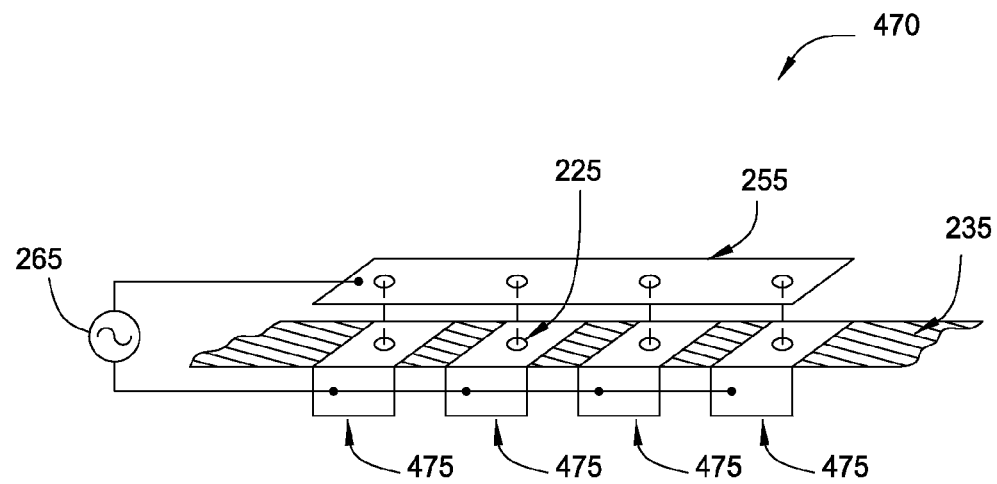
FIGS. 4B and 4C illustrate configurations for synthetic jet devices in an aerodynamic structure, according to embodiments described herein.
Figure 4C:
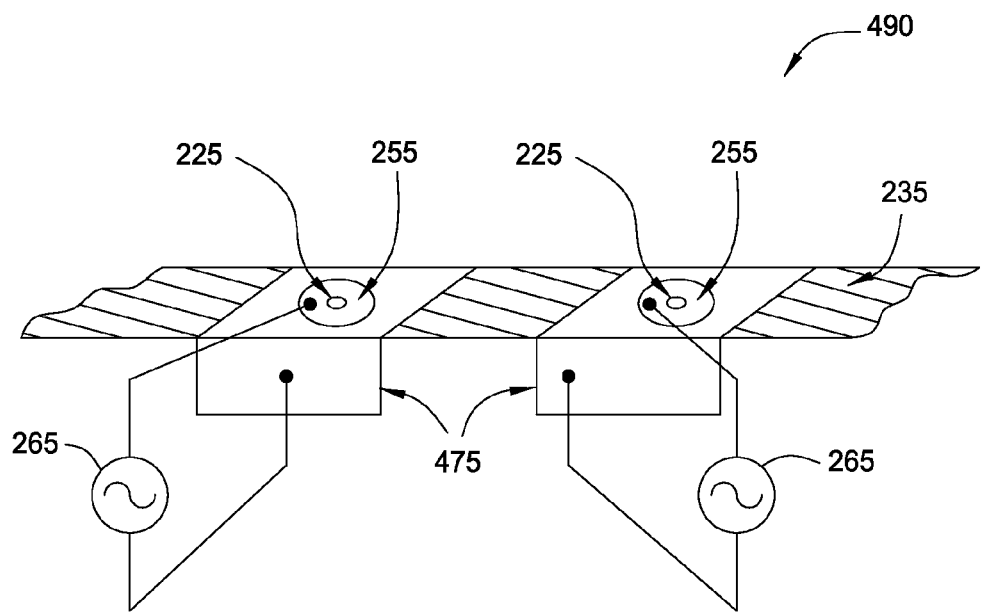

FIGS. 4B and 4C illustrate configurations for synthetic jet devices in an aerodynamic structure, according to embodiments described herein. Assembly 470 includes an aerodynamic surface 230 and four (4) synthetic jet devices 475 disposed in a single row. Synthetic jet devices 475 may be the same or may operate in a substantially similar manner to synthetic jet devices 200, 280, 298 described above. For simplicity, the aerodynamic surface 235 adjacent to each of the synthetic jet devices 475 is shown having the same width as the synthetic jet devices; however, the surface may extend such that the synthetic jet devices are surrounded by the aerodynamic surface. These configurations are provided only as non-limiting examples; of course, any number of synthetic jet devices may be used, in any feasible disposition or arrangement, such as an array having multiple rows and columns, an array having staggered rows or columns, a radial arrangement, and so forth. Each of the synthetic jet devices includes an aperture 225, through which chamber gases are propelled. In one embodiment, surface electrodes 255 corresponding to each of the synthetic jet devices are included as a single strip electrode that is shared by multiple synthetic jet devices (in this case, one strip electrode corresponding to the entire row) and having openings corresponding to the apertures of each synthetic jet device 475. For ease of display, the strip electrode is illustrated in an exploded view; normally, the strip electrode is disposed adjacent to the synthetic jet devices and/or the aerodynamic surface 235. The surface electrode 255 is coupled to power supply 265, which in turn is coupled to an inner electrode 260 (not shown) disposed in each of the synthetic jet devices 475.

Referring now to the embodiment illustrated in FIG. 4C, assembly 490 includes aerodynamic surface 235 and two (2) synthetic jet devices 475 disposed in a row. In this embodiment, a distinct surface electrode 255 is provided to each synthetic jet device 475. While depicted here as circular electrodes having a circular opening corresponding to size of aperture 225, the surface electrodes 255 may alternately have any feasible shape and size, as discussed above. The surface electrodes 255 are each coupled to a power supply 265, which in turn is coupled to an inner electrode 260 (not shown) disposed in each of the synthetic jet devices 475. While separate power supplies 265 are shown, alternate embodiments may provide a single power supply 265 coupled to multiple surface electrodes 255.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A plasma-assisted synthetic jet actuator, comprising:
an aerodynamic structure having an aerodynamic surface and forming an aperture through the aerodynamic surface;
one or more walls forming a chamber within the aerodynamic structure and adjacent to the aerodynamic surface, wherein the chamber is in fluid communication with an ambient environment through the aperture; and
an ionizing device disposed at the aperture and configured to ionize one or more nonionized chamber gases exiting through the aperture into the ambient environment, wherein the one or more nonionized chamber gases are propelled toward the aperture by a propulsion source distinct from the ionizing device.

2. The plasma-assisted synthetic jet actuator of claim 1, wherein the propulsion source comprises a pressure differential between the chamber and the ambient environment.

3. The plasma-assisted synthetic jet actuator of claim 1, wherein the propulsion source comprises a gas propulsion device configured to propel the one or more nonionized chamber gases through the aperture.

4. The plasma-assisted synthetic jet actuator of claim 3, wherein the gas propulsion device is a piezoelectric-actuated diaphragm.

5. The plasma-assisted synthetic jet actuator of claim 1, wherein the ionizing device comprises first and second electrodes disposed on opposing sides of the aerodynamic surface.

6. The plasma-assisted synthetic jet actuator of claim 5, further comprising an insulating layer configured to at least partially cover one of the first and second electrodes.

7. The plasma-assisted synthetic jet actuator of claim 1, wherein the ionized chamber gases are steerable using at least one of an actuating device configured to pivot the plasma-assisted synthetic jet actuator and one or more electromagnets disposed within the aerodynamic structure and in proximity of the plasma-assisted synthetic jet actuator.

8. The plasma-assisted synthetic jet actuator of claim 3, further comprising a first power supply providing a first signal to the gas propulsion device, and a second power supply providing a second signal to the ionizing device, wherein the first signal is synchronized with the second signal.

9. The plasma-assisted synthetic jet actuator of claim 8, wherein a pulse of the second signal is delayed by a predetermined amount from a pulse of the first signal, the predetermined amount based on an amount of time for a volume of the propelled one or more nonionized chamber gases to reach the aperture.

10. An aircraft, comprising:
a thrust source;
one or more lifting surfaces configured to generate a lift force when coupled to the thrust source; and
at least one plasma-assisted synthetic jet actuator configured to provide air flow control at an aerodynamic structure of the aircraft, the aerodynamic structure having an aerodynamic surface and forming an aperture through the aerodynamic surface, and the plasma-assisted synthetic jet actuator comprising:
one or more walls forming a chamber within the aerodynamic structure and adjacent to the aerodynamic surface, wherein the chamber is in fluid communication with an ambient environment through the aperture; and
an ionizing device disposed at the aperture and configured to ionize one or more nonionized chamber gases exiting through the aperture into the ambient environment, wherein the one or more nonionized chamber gases are propelled toward the aperture by a propulsion source distinct from the ionizing device.

11. The aircraft of claim 10, wherein the the propulsion source comprises a gas propulsion device configured to propel the one or more nonionized chamber gases through the aperture.

12. The aircraft of claim 10, further comprising one or more control surfaces, wherein the at least one plasma-assisted synthetic jet actuator is configured to augment the one or more control surfaces.

13. The aircraft of claim 11, the synthetic jet actuator further comprising a first power supply providing a first signal to the gas propulsion device, and a second power supply providing a second signal to the ionizing device, wherein the first signal is synchronized with the second signal.

14. A method to improve aerodynamic properties of an aerodynamic structure, the method comprising:
providing air flow control at the aerodynamic structure by ionizing one or more nonionized gases exiting through an aperture formed in an aerodynamic surface of the aerodynamic structure,
wherein the air flow control is provided by a plasma-assisted synthetic jet actuator, comprising:
one or more walls forming a chamber within the aerodynamic structure and adjacent to the aerodynamic surface, wherein the chamber is in fluid communication with an ambient environment through the aperture; and
an ionizing device disposed at the aperture and configured to ionize one or more nonionized chamber gases exiting through the aperture, wherein the one or more nonionized chamber gases are propelled toward the aperture by a propulsion source distinct from the ionizing device.

15. The method of claim 14, wherein the propulsion source comprises a gas propulsion device.

16. The method of claim 14, wherein the aerodynamic structure is included in an aircraft, and wherein the air flow control is used to at least augment one or more control surfaces of the aircraft.

17. The method of claim 16, wherein the aerodynamic structure is an inlet of a jet engine of the aircraft.

18. The method of claim 15, wherein the gas propulsion device is coupled to a first power supply, and the ionizing device is coupled to a second power supply, wherein a first signal provided by the first power supply is synchronized with a second signal provided by the second power supply.

19. The aircraft of claim 10, wherein the propulsion source comprises a pressure differential between the chamber and the ambient environment.

20. The aircraft of claim 11, wherein the gas propulsion device is a piezoelectric-actuated diaphragm.

21. The method of claim 14, wherein the propulsion source comprises a pressure differential between the chamber and the ambient environment.

22. The method of claim 15, wherein the gas propulsion device is a piezoelectric-actuated diaphragm.

* * * * *